United States Patent
Lee et al.

[19]

[11] Patent Number: 5,963,904
[45] Date of Patent: Oct. 5, 1999

[54] PHONEME DIVIDING METHOD USING MULTILEVEL NEURAL NETWORK

[75] Inventors: Young Jik Lee, Daejeon; Young Joo Suh, Kyoungsangbuk-do; Jae Woo Yang, Daejeon, all of Rep. of Korea

[73] Assignee: Electronics and Telecommunications Research Institute, Daejeon, Rep. of Korea

[21] Appl. No.: 08/746,981

[22] Filed: Nov. 19, 1996

[30] Foreign Application Priority Data

Dec. 22, 1995 [KR] Rep. of Korea ................. 95-53941

[51] Int. Cl.⁶ ........................................... G10L 7/08
[52] U.S. Cl. .................... 704/254; 704/202; 704/232; 704/253
[58] Field of Search ................... 704/232, 259, 704/202, 200, 231, 253, 254, 255, 248, 249, 250, 252; 382/155, 156, 159; 395/21

[56] References Cited

U.S. PATENT DOCUMENTS

| | | | |
|---|---|---|---|
| 4,592,085 | 5/1986 | Watari et al. | 704/254 |
| 4,956,865 | 9/1990 | Lennig et al. | 704/241 |
| 5,131,043 | 7/1992 | Fujii et al. | 704/254 |
| 5,285,522 | 2/1994 | Mueller | 704/232 |
| 5,638,487 | 6/1997 | Chigier | 704/253 |

OTHER PUBLICATIONS

Youngjoo Soo and Youngjik Lee, "Phoneme Segmentation of Continuous Speech Using Multi–Layer Perceptron," Proceedings of Fourth International Conference on Spoken Language Processing ICSLP '96 (Philadelphia), Oct. 3–6 1996, pp. 1297–1300.

Hong C Leung, Benjamin Chigier, and James R. Glass, "A Comparative Study of Signal Representations and Classification Techniques for Speech Recognition," IEEE, 1992, pp. 680–682.

Don R. Hush and Bill G. Horne, "Progress in Supervised Neural Networks," IEEE Signal Processing Magazine, Jan. 1993, pp. 8–39.

Dan Hammerstrom, "Working With Neural Networks," IEEE Spectrum, Jul. 1993, pp. 46–53.

Phonemic Segmentation Of Fluent Speech; David B. Grayden, Michael S. Scordilis; 1994; pp. 73–76.

A System for Acoustic–Phonetic Analysis of Continuous Speech; Clifford J. Weinstein, Stephanie S. McCandless, Lee F. Mondshein, and Victor W. Zue; 1975; pp. 54–66.

The Use of Speech Knowledge in Automatic Speech Recognition; Victor W. Zue; 1985; pp. 1602–1615.

*Primary Examiner*—David R. Hudspeth
*Assistant Examiner*—Donald L. Storm
*Attorney, Agent, or Firm*—Antonelli, Terry, Stout & Kraus, LLP

[57] ABSTRACT

A phoneme dividing method using a multilevel neural network applied to a phoneme dividing apparatus having a voice input portion, a preprocessor, a multi-layer perceptron (MLP) phoneme dividing portion, and a phoneme border outputting portion includes the steps of: (a) sequentially segmenting and framing voice with digitalized voice samples, extracting characteristic vectors by vocal frames, and extracting an inter-frame characteristic vector of the difference between nearby frames of the characteristic vectors by frames, to thereby normalize the maximum and minimum of the characteristics; (b) storing information on the weight obtained through learning and the standard of the MLP; and (c) reading the weight obtained in the step (b), receiving the characteristic vectors, performing an operation of phoneme border discrimination to generate an output value, discriminating the phoneme border according to the output value, and if the current analyzed frame arrives two frames preceding the final frame of incoming voice, outputting a frame number indicative of the border of phoneme as a final result.

3 Claims, 3 Drawing Sheets

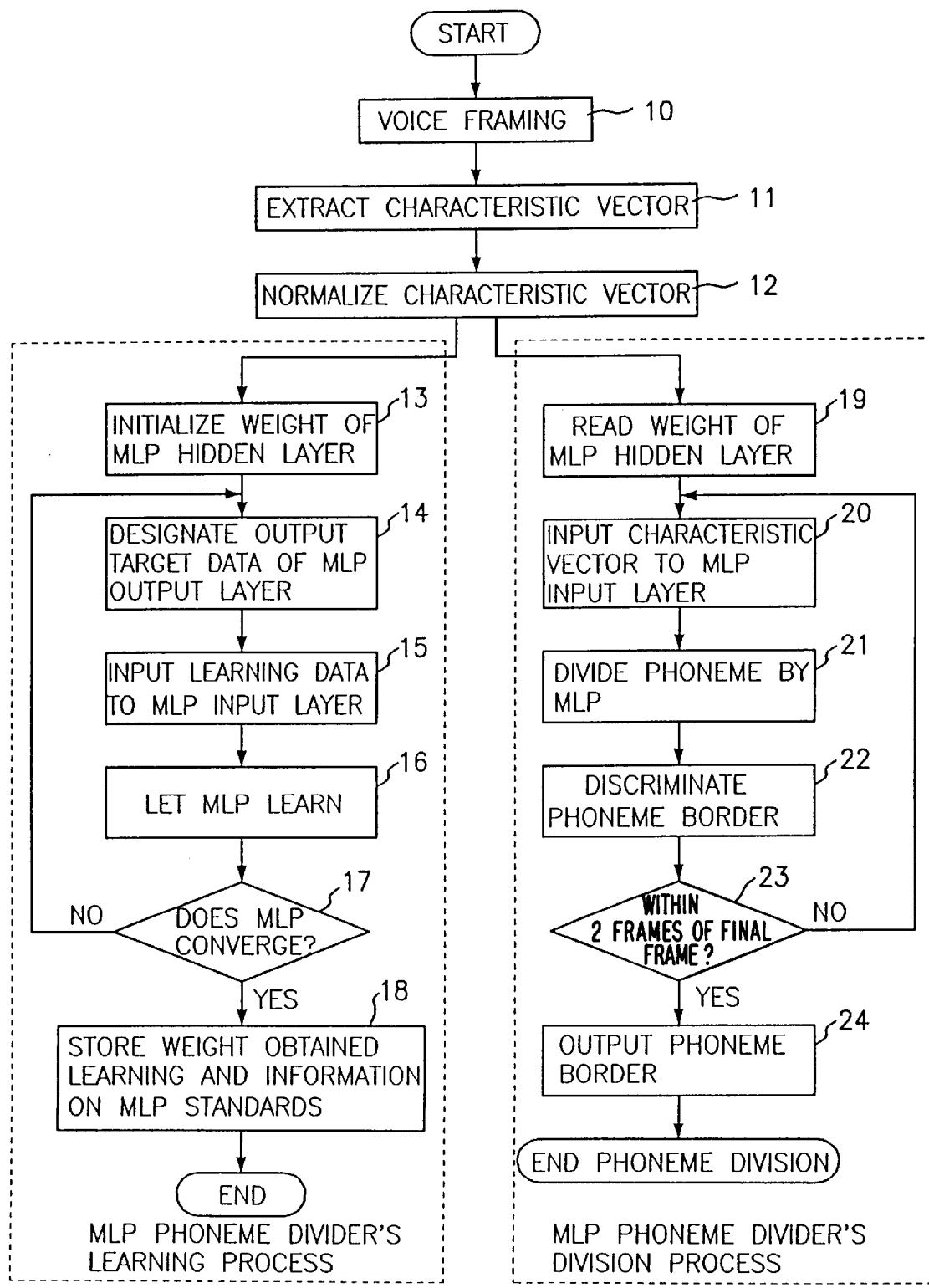

PHONEME DIVIDING METHOD USING MULTILEVEL NEURAL NETWORK

BACKGROUND OF THE INVENTION

The present invention relates to a phoneme dividing method using a multilevel neural network.

Conventional phoneme dividing technologies complicate their systems by finding the border of phonemes through an analysis utilizing prefixed various phonetic knowledge and rules after extracting the frequency component, that is, the spectrogram, from an acoustic signal.

Without an effective and optimal method for combining various knowledge and rules used in phoneme division, the performance of system is not reliable and drastically deteriorated depending upon the and any changes therein of situation.

There is a method for finding the border of a phoneme by comparing characteristic patterns with an incoming signal in phoneme division after previously extracting the characteristics of all phonemes and storing them in patterns. This method requires information regarding the characteristic patterns for all phonemes to undesirably increase the volume of memory of the system and also the amount of calculation in performance.

SUMMARY OF THE INVENTION

Therefore, it is an object of the present invention to provide a phoneme dividing method using a multilevel neural network for precisely and efficiently capturing the point of the phoneme border, using only the variation of vocal signals appearing at the border of phonemes, without additional knowledge of the phoneme itself, to be thereby utilized in application fields requiring automatic phoneme division or phoneme labeling.

To accomplish the object of the present invention, there is provided a phoneme dividing method using a multilevel neural network applied to a phoneme dividing apparatus having a voice input portion for outputting a vocal sample digitally converted vocal signals a preprocessor for extracting a characteristic vector suitable for phoneme division from the input vocal sample phoneme from the voice input portion, a multi-layer perceptron (MLP) phoneme dividing portion for finding and outputting the border using the characteristic vector of the preprocessor, and a phoneme border outputting portion for outputting position information on the phoneme border of the MLP phoneme dividing portion in the form of frame position, the method comprising the steps of: (a) sequentially segmenting and framing a voice with digitalized voice samples, extracting characteristic vectors by vocal frames, and extracting an inter-frame characteristic vector of the difference between nearby frames of the characteristic vectors by frames, to thereby normalize maximum and minimum characteristics; (b) initializing weights present between an input layer and a hidden layer and between the hidden layer and an output layer of the MLP, designating an output target data of the MLP, inputting the characteristic vectors to the MLP for learning, and storing and finishing information on the weight obtained through learning and the standard of the MLP if the reduction rate of a mean squared error converges within a permissible limit; and (c) reading the weight obtained in step (b), receiving the characteristic vectors, performing an operation of phoneme border discrimination to generate an output value, discriminating the phoneme border according to the output value, and if the current analyzed frame arrives two frames preceding the final frame of an incoming voice signal, outputting a frame number indicative of the border of phoneme as a final result.

BRIEF DESCRIPTION OF THE ATTACHED DRAWINGS

FIG. 3 is a flowchart of one embodiment of the present invention.

DETAILED DESCRIPTION OF PREFERRED EMBODIMENT

Hereinafter, a preferred embodiment of the present invention will be described below.

Figure 1:
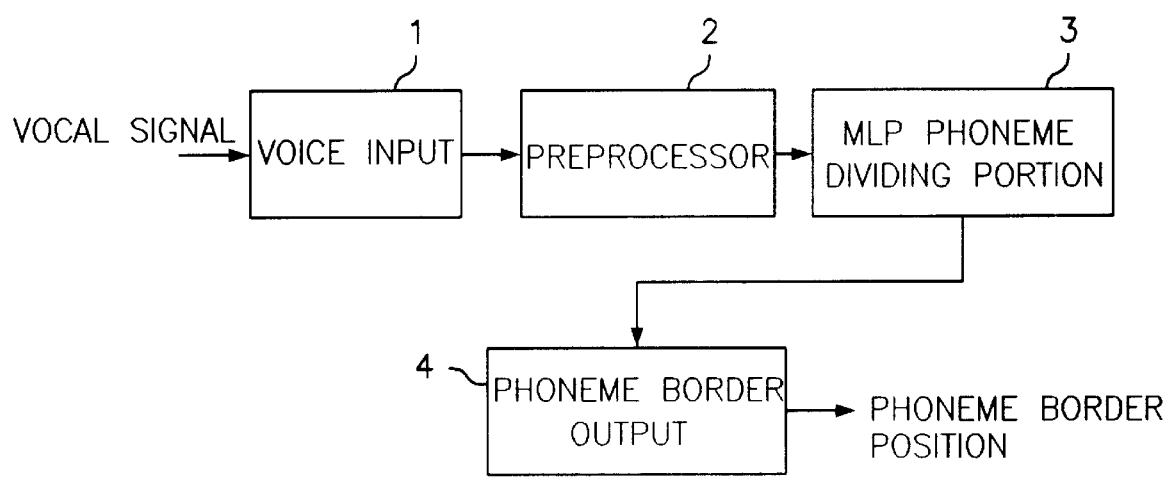
FIG. 1 is a block diagram of a system to which the present invention is applied.

In FIG. 1 reference numeral 1 represents a voice input portion. Reference numeral 2 is a preprocessor, 3 is a multilayer perception (MLP) phoneme dividing portion, and 4 is a voice border output portion.

Voice input portion 1 comprises a microphone for converting an aerial vocal waveform into an electric vocal signal, a band-pass filter for eliminating low-frequency noise and high-frequency aliasing from the vocal signal input as an electric analog signal, and an analog-to-digital converter (ADC) for converting the analog vocal signal into a digital vocal signal. The voice input portion outputs a vocal sample converted into digital from the voice, to preprocessor 2.

Preprocessor 2 extracts characteristic vectors suitable for phoneme division from the vocal samples input from voice input portion 1, and outputs them to MLP phoneme dividing portion 3. MLP phoneme dividing portion 3 finds the border of phoneme, using characteristic vectors input from preprocessor 2, and outputs the result to phoneme border output portion 4. Phoneme border output portion 4 outputs position information on the phoneme border automatically divided in MLP phoneme dividing portion 3 in the form of a frame position.

Figure 2:
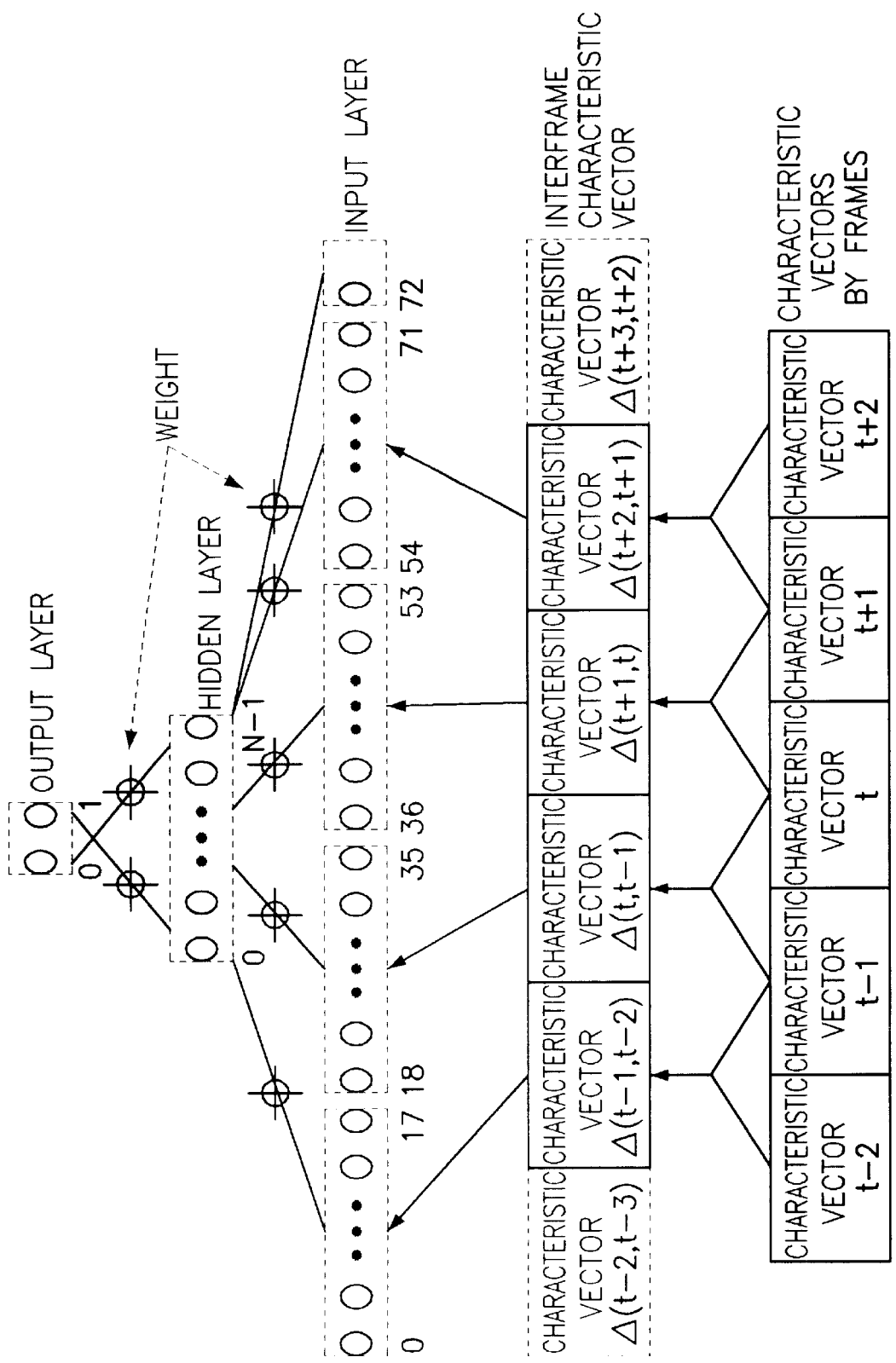
FIG. 2 shows a configuration of a multilevel neural network used for the present invention.

Referring to FIG. 2, one embodiment of the present invention implements an effective and reliable automatic phoneme segmenter by using a multi-layer perceptron (MLP), one kind of neural network, in order to complement the drawbacks of the conventional phoneme dividing method based upon knowledge or rules.

A phoneme dividing method using MLP is very favorable for reducing any decrease in performance caused due to imperfect modeling of knowledge or rules on the border of phoneme contained in a vocal signal. In this method, functions required in phoneme division are learned voluntarily from the characteristic vectors extracted from a large amount of vocal data so that the MLP itself finds the knowledge or rules contained in the vocal signal, without previously introducing specific suppositions, rules or knowledge on the phoneme border. Accordingly, the method of the present invention eliminates the introduction of unsure supposition or additional processing of distribution or modeling of the vocal signal in order to facilitate its modeling.

MLP used in the present invention is made in a multiple structure of three layers of input, hidden and output layers. As shown in the drawing, the input layer placed on the bottom is made with 73 input nodes of 72 input nodes for inter-frame characteristic vectors extracted from four inter-frame differences generated among five sequential frames, and one input node for an input value 1 to be used instead of the threshold value comparison process in the hidden layer of MLP.

The output node of the output layer is made with two nodes of the first node indicative of the border of phoneme, and the second node not indicative of the border of phoneme. The hidden layer placed between the input and output layers is to perform nonlinear discrimination that the MLP must implement.

The following nonlinear sigmoid function is used for the activation function of the hidden layer.

$$y = (\exp(x)-1)/(\exp(x)+1)$$

where x and y represent the input and output of the activation function, respectively.

The number N of nodes of the hidden layer is known to be closely relevant to the final function of MLP. It is noted through an experiment using various kinds of data that it is appropriate that the number of nodes be between 10 and 30. Between the input layer and hidden layer and between the hidden layer and output layer, there are weights which connect all of the nodes of the respective layers. Because the weights connect all of the nodes between the layers, its number is 73×N (the number of input nodes x the number of hidden nodes) in case of the input layer and hidden layer. The number of weights is N×2 (the number of hidden node x the number of output node). These functions are previously obtained through learning using an error back propagation algorithm, stored in a memory, and then read out in phoneme division.

FIG. 3 shows a procedure of the phoneme division algorithm in preprocessor 2 and MLP phoneme dividing portion 3, having two parts of the learning process and the dividing process of the MLP phoneme dividing algorithm.

Above all, the process of voice framing and characteristic vector extraction is performed in preprocessor 2 and used commonly in the learning and dividing processes. In selecting the characteristic vectors in the present invention, factors explicitly indicative of the difference of spectrum between frames are induced in order to show that the variation of the vocal spectrum is severe at the border of phonemes.

Voice samples are sequentially segmented in a length so long as to extract the voice characteristics from digitalized voice samples, for the purpose of voice framing in step 10. Voice framing is performed by taking Hamming windows in intervals 16 msec every 10 msec with respect to the overall incoming vocal samples.

Then, the characteristic vectors are extracted from the voice frames in step 11 containing two substeps. In the first step, characteristic vector frames effectively indicative of the characteristics of voice are extracted on the basis of phonetic knowledge, with respect to the respective voice frames obtained before. In the second step, inter-frame characteristic vectors of the difference between nearby frames with respect to the characteristic vectors by frames obtained in the first step are extracted to be used as the final characteristic vectors input to MLP phoneme dividing portion 3.

For a more detailed description of the above procedure, the characteristic vectors first obtained with respect to the respective frames are as follows.

(1) frame energy: indicates the intensity of phonation by frames and is found according to the following equation.

$$ENG\_FRM(t) = \log 10\left(\sum_n s(n) * s(n)\right), n = 0, 1, \ldots, N$$

where s(n) represents a vocal sample belonging to the $t_{th}$ frame, and

N represents the vocal frame length.

(2) 16th degree Mel-scaled fast Fourier transform (FFT): First, FFT is performed in order to obtain the spectrum, the frequency characteristic of voice by frames, and the frequency component of voice is classified into predetermined 16 frequency bands similar to the human hearing characteristics, to obtain 16th degree energy by bands which is used as the coefficient of the Mel-scaled FFT. The $j_{th}$ degree Mel-scaled FFT coefficient for frame index t is obtained as follows.

$$MSFC(j, t) = \log 10\left(\sum_{f=1}^{16} s(j, t, f)\right)$$

where f represents the frequency belonging to the respective frequency bands;

j is the index of the respective frequency bands; and s(j,t,f) is $j_{th}$ degree frequency band amplitude spectrum of $t_{th}$ frame obtained from FFT by frequencies.

(3) energy ratio by bands: It is very important to precisely discriminate phonemes into voiced sound and voiceless sound in phoneme division. The difference between voiced and voiceless sounds is the distribution of energy by frequency bands. In order to discriminate voiceless and voiced sounds in the present invention, the low-frequency energy between 0 and 3 kHz and the high-frequency energy between 3 and 8 kHz are obtained respectively, and their ratio is selected as one of the characteristic vectors.

$$ENG\_RTO = \log 10(ENG\_LOW(t)) - \log 10(ENG\_HIGH(t))$$

$$ENG\_LOW(t) = \sum_f s(f, t), f = 0, \ldots, 3\text{kHz}$$

$$ENG\_HIGH(t) = \sum_f s(f, t), f = 3\text{kHz}, \ldots, 8\text{kHz}$$

Where ENG_LOW(t), and ENG_HIGH(t) are energies of the low and high frequency bands of the $t_{th}$ voice frame, respectively, which are obtained by the sum of components contained in the respective bands at the amplitude spectrum obtained in the FFT.

The inter-frame characteristic vectors used as the final input of MLP phoneme dividing portion 3 can be obtained by finding the difference between nearby frames with respect to the first characteristic vectors by frames on basis of the fact that the variation of phoneme division occurs at the border of phonemes.

(1) difference of frame energy between nearby frames
  dENG_FRM(t)=|ENG_FRM(t)−ENG_FRM(t−1)|

(2) inter-frame difference of $16_{th}$ degree Mel-scaled FFT
  dMSFC(j,t)=|MSFC(j,t)−MSFC(j,t−1)|, j=0,1,. . .,15

Here, j represents the respective degrees of the coefficients.

(3) inter-frame difference of energy ratio by frames
  dENG_RTO(t)=|ENG_RTO(t)−ENG_RTO(t−1)|

After the characteristic vectors are extracted as above, they are normalized in step 12 whose maximum and minimum become 1 and −1, respectively, in order to be used as the input of MLP phoneme dividing portion 3.

In the learning process of MLP phoneme dividing portion 3 using the normalized characteristic vectors, weights present between the input and hidden layers and the hidden and output layers are initialized in step 13 as the initial learning step of MLP phoneme dividing portion 3. The initial value is established as an arbitrary value distributed between 1 and −1.

After this step, output target data of the output layer, which teaches finding the border of phonemes, is designated in step 14. The output target data by frames is equal to the number of the MLP output nodes, having values of (1,−1) in case of the border of phoneme and (−1,1) in other cases. This output target data is made to coincide with the frame position of corresponding characteristic vectors using information on the phoneme border obtained from previously phoneme-divided voice databases.

After the designation of output target data, the characteristic vectors, learning data, are input to the input layer of the MLP in step 15 so as to teach the MLP in step 16. The input layer has 73 nodes of 72 input nodes for the input of the four sequential inter-frame characteristic vectors and one input node for 1 to be input instead of the threshold value comparison procedure of the hidden layer.

The four inter-frame characteristic vectors are extracted among four intervals generated from five frames including preceding and succeeding two frames t−2, t−1, t+1, t+2, centering on the currently analyzed frame t, as shown in the lower portion of FIG. 2. The learning algorithm of the phoneme dividing MLP uses the generally used error back propagation algorithm.

After this learning process of MLP, if the reduction rate of mean squared error converges within a permissible limit in step 17, the weights obtained through learning and information on the standard of the MLP are stored in step 18 to finish the learning process. After the learning process, the voice is sequentially segmented in a length so long as to extract the voice characteristics from the digitalized vocal samples for voice framing in step 10, and the characteristic vectors are extracted in step 11 and normalized in step 12.

The weights obtained in the learning process are read into the hidden layer of the MLP in step 19. Then, the 72 characteristic vectors obtained in the above process are input in the sequence of the input nodes of the MLP, and 1 is input to the final $73_{th}$ input node in step 20.

In MLP phoneme dividing portion 3, the output value for phoneme border discrimination is produced through the following MLP operation with respect to incoming characteristic vectors in step 21.

$$HID(j) = SGMOD\left(\sum_i IN(i) * WGT\_IH(i, j)\right),$$

$$i = 0, 1, \ldots, 72 \ j = 0, 1, \ldots, N-2 \ HID(N-1) = 1$$

$$OUT(k) = SGMOD\left(\sum_j HID(j) * WGT\_HO(j, k)\right),$$

$$j = 0, 1, \ldots, N-1, k = 0, 1$$

where IN(j) represents the input of the $i_{th}$ input node;

OUT(k) is the output of the $k_{th}$ output node;

WGT_IH(i,j) is the weight connecting the $i_{th}$ input node and $j_{th}$ hidden node;

WGT_HO(j,k) is the weight connecting the $i_{th}$ hidden node and the $k_{th}$ output node; and SGMOD represents the aforementioned sigmoid function.

Value 1 is designated to the final hidden node instead of the threshold comparison procedure in the final output node.

When the output values operated in MLP phoneme dividing portion 3 are compared in discriminating the border of phoneme, if the first output value OUT(0) is positive, the analyzed frame is the border of phoneme. In contrast, if OUT(1) is positive, it is determined in step 22 that the frame is not the border of phoneme.

In step 23, it is checked whether the currently analyzed frame arrives two frames preceding the final frame of the incoming voice. If not, the procedure of inputting the characteristic vectors to the MLP input layer is iterated. If the currently analyzed frame arrives two frames preceding the final frame, the value expressed as a frame number indicative of the border of phoneme is output as the final result in step 24, and the whole procedure ends.

In implementing a voice recognition system which makes it possible the conversation between human beings and machines, the present invention operating as above divides voice in units of phoneme and enables precise and effective phoneme division preprocessing essentially required phoneme recognition based upon phoneme division with respect to the divided phoneme segments. In addition, the present invention enables automatic voice division instead of the conventional manual operation by voice experts in constructing a large volume of phoneme-divided voice database required in implementing a phoneme-unit voice recognition and voice mixing system. This reduces time and cost.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A phoneme dividing method using a multilevel neural network applied to a phoneme dividing apparatus having a voice input portion for outputting a user's digitally converted vocal sample, a preprocessor for extracting a characteristic vector suitable for phoneme division from the vocal sample input at the voice input portion, a multi-layer perceptron (MLP) phoneme dividing portion for finding and outputting the phoneme border using the characteristic vector of the preprocessor, and a phoneme border outputting portion for outputting position information regarding the phoneme border of the MLP phoneme dividing portion in the form of frame position, said method comprising the steps of:

(a) sequentially segmenting and framing a voice with digitalized voice samples, extracting characteristic vectors by vocal frames, and extracting an inter-frame characteristic vector of the difference between nearby frames of the characteristic vector by frames, to thereby normalize the maximum and minimum of said inter-frame characteristic vectors;

(b) initializing weights present between an input layer and a hidden layer and between the hidden layer and an output layer of said MLP, designating an output target data of said MLP, inputting said inter-frame characteristic vectors extracted from a currently analyzed frame to said MLP for learning, and storing and finishing information on the weight obtained through learning and the standard of said MLP if the reduction rate of a mean squared error converges within a permissible limit; and (c) reading the weight obtained in said step (b), receiving said inter-frame characteristic vectors from the currently analyzed frame, performing an operation of phoneme border discrimination to generate output values, discriminating the phoneme border according to the output values, and if the current analyzed frame arrives two frames preceding the final frame of the end portion of the vocal samples, outputting a frame number indicative of the border of phoneme as a final result.

2. The method as claimed in claim 1, wherein the voice framing of said step (a) is performed by taking a Hamming window in a length of 16 msec every 10 msec, with respect to the overall length of the end portion of the vocal samples.

3. The method as claimed in claim 1, wherein the phoneme border discrimination of said step (c) is performed such that the output values OUT (0) and OUT (1) are compared, and it is determined that if OUT (0) is larger than OUT (1) then the analyzed frame is the phoneme border, and if OUT (1) is larger than OUT (0) the analyzed frame is not the phoneme border.

\* \* \* \* \*